United States Patent
Harsley (10) Patent No.: US 8,709,568 B2
(45) Date of Patent: Apr. 29, 2014

(54) MOULDED TIE STRIPS

(76) Inventor: Andrew John Harsley, Grantham (GB)

(*) Notice: Subject to any disclaimer, the term of this patent is extended or adjusted under 35 U.S.C. 154(b) by 126 days.

(21) Appl. No.: 13/058,329

(22) PCT Filed: Aug. 7, 2009

(86) PCT No.: PCT/GB2009/050993
§ 371 (c)(1),
(2), (4) Date: Mar. 2, 2011

(87) PCT Pub. No.: WO2010/018397
PCT Pub. Date: Feb. 18, 2010

(65) Prior Publication Data
US 2011/0143074 A1 Jun. 16, 2011

(30) Foreign Application Priority Data
Aug. 9, 2008 (GB) .................................. 0814599.7

(51) Int. Cl.
*B32B 3/24* (2006.01)
*B65D 63/10* (2006.01)

(52) U.S. Cl.
USPC ........... 428/43; 24/16 PB; 24/17 A; 24/17 AP (58) Field of Classification Search
USPC ............... 428/43; 206/820; 24/16 PB, 17 AP, 24/30.5 R, 17 A
See application file for complete search history.

(56) References Cited

U.S. PATENT DOCUMENTS

| 3,186,047 | A | 6/1965 | Schwester et al. |
| 3,438,095 | A | 4/1969 | Evans |
| 5,799,376 | A | 9/1998 | Harsley |
| 5,987,706 | A | 11/1999 | Boe |
| 2006/0127638 | A1* | 6/2006 | Harsley .......................... 428/131 |

FOREIGN PATENT DOCUMENTS

| EP | 0295753 | 12/1988 |
| GB | 1133159 | 11/1968 |
| GB | 2072739 | 10/1981 |
| WO | WO 0055067 | 9/2000 |

* cited by examiner

Primary Examiner — Alexander Thomas
(74) Attorney, Agent, or Firm — Eric Karich (57) ABSTRACT

A sheet of cellular tie strips, where each strip is composed of a series of unit cell portions connected end-to-end, is formed in a single molding process. Lateral webs join one or more strips side-by-side to form a sheet such that each strip can be readily separated by tearing, stamping, cutting, leaving only a very thin vestige which does not interfere with the tying of the strips in use.

9 Claims, 9 Drawing Sheets

MOULDED TIE STRIPS

The present invention relates to the production of continuous-chain tie strips as used, for example, as cable ties or horticultural plant ties.

BACKGROUND OF THE INVENTION

Figure 1:
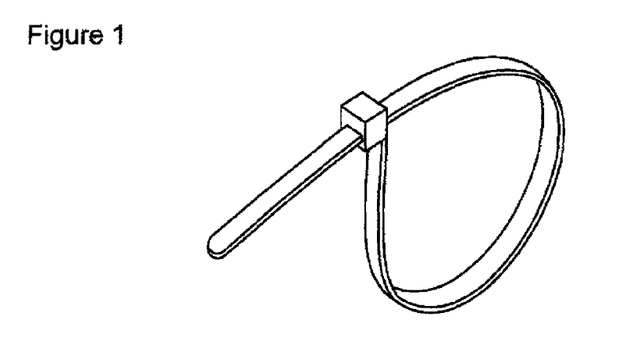
FIG. 1 shows a conventional cable tie strip.

Numerous forms of plastic tie strip are described in the prior art with many varieties being manufactured by injection-moulding from suitable polymer materials. Cable ties (e.g. U.S. Pat. No. 3,186,047, Schwester et al) are a classic example of the technology, as generally shown in FIG. 1. They have a head and a long flat tail, the head having a corresponding slit through which the tail can pass, with a ratchet arrangement to hold the tie in place. They are conventionally produced by standard injection-moulding processes, using either cold or hot runner systems, the latter commonly being the most suitable method for mass production.

Figure 2:
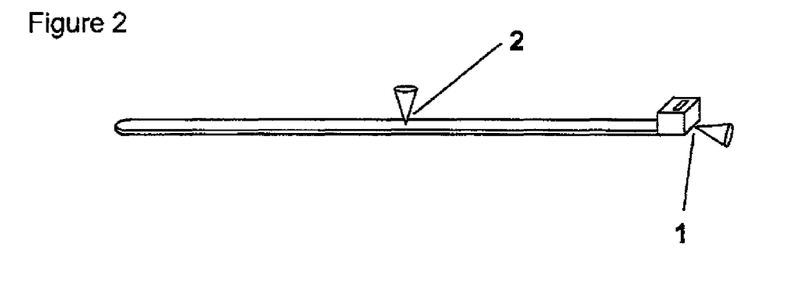
FIG. 2 shows two optional gating locations for a conventional cable tie strip.

The moulding process for these forms of tie strip is normally to fill the mould cavity through a single small orifice cut into the mould known as a gate 1, the gate usually being sited at one end of the tie (FIG. 2).

This allows the polymer melt to flow to the other end of the part, thereby filling the cavity without voids. By locating the gate at the end (a functionally uncritical zone), any residual material or gate vestige at the point of entry will not impede the threading of the tie when in use.

Figure 3:
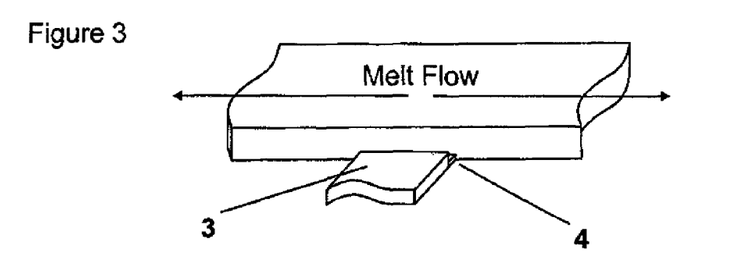
FIG. 3 shows the moulding of a conventional cable tie strip through a side-located tab gate with a small land area.
Figure 4:
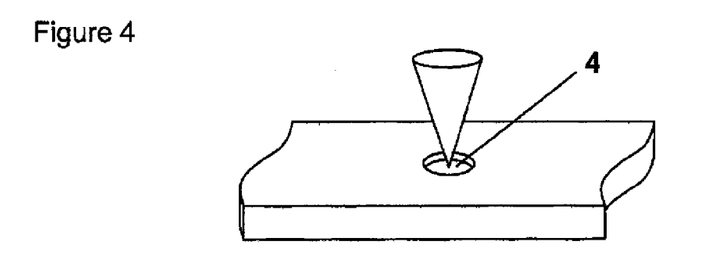
FIG. 4 shows the moulding of a tie strip through a countersunk pin gate located on the top.

An alternative location for the gate—especially on very long ties—is roughly halfway along the length, as shown at 2. The polymer melt then bifurcates to flow to either end, thus halving the distance it must travel and thereby reducing the injection pressure requirements. Normally such a gate would be located in a place that minimises any gate vestige. Often this is on the narrow side of the tie, as shown by reference 3 in FIG. 3, with the gate kept as small as practical. Tab gates with minimal land 4 may be employed in this respect. Alternatively, the mould may be gated on the top surface FIG. 4, and the gate may be sunk into the tie 4 to keep any gate vestige below the working surface. Pin gates are the usual method employed here.

A more versatile type of tie strip is described in prior art such as U.S. Pat. No. 3,438,095 (Evans), U.S. Pat. No. 5,799,376 (Harsley) and WO 2004/108550 (Harsley), the latter being illustrated in FIG. 5. The strip has a relatively short threading end or tongue 9, and a long tail of constant width formed of a multitude of identical cells 101, through any one of which the tongue can pass, followed by some cells; the cells each have retaining arms or hooks 103 to keep the tie closed.

Figure 5:
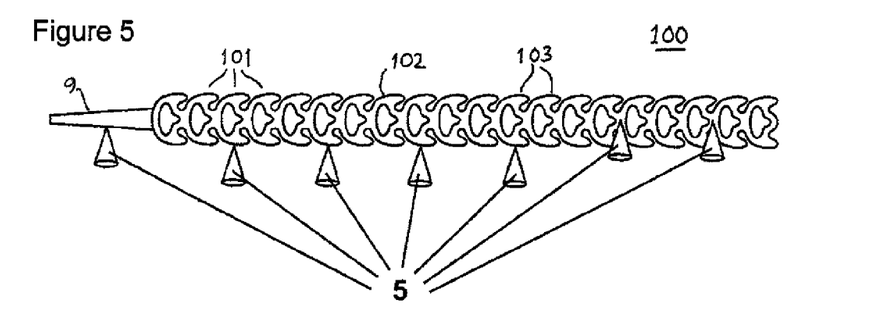
FIG. 5 shows a typical long-chain tie strip with multiple gate locations on the side and top to ensure adequate low-pressure filling.

These forms of tie are also often produced by injection moulding, but their complex geometry results in very long and winding flow paths for the polymer melt. This leads to manufacturing difficulties because much higher injection pressures are required. Although a central gate will somewhat reduce the required injection pressure (halving it, to a first approximation), this is still not sufficient for these types of tie strip. Because injection-moulding machines have limiting injection pressures and clamping forces, the total number of cavities that can be filled decreases as the pressure required to fill them increases. That is, high pressure requirements will limit the number of parts that can be made in each moulding cycle. Hence, for any given machine, improved productivity can only be attained by lowering injection pressures, and this calls for multiple gates 5, as shown in FIG. 5.

Figure 6:
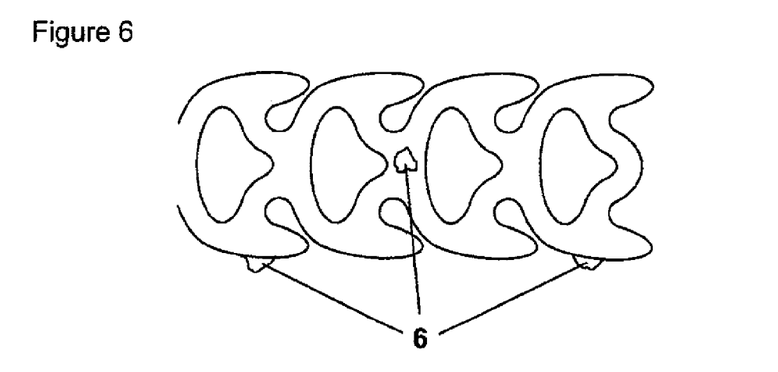
FIG. 6 shows typical gate vestiges left over from the moulding process.
Figure 7:
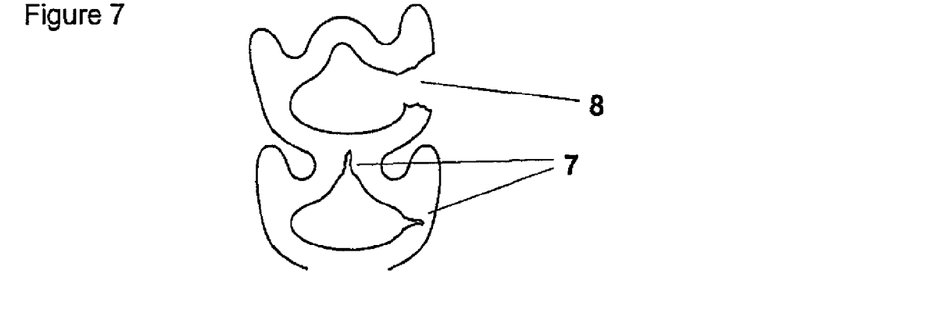
FIG. 7 shows damage to the sides of the cells that can occur from gate vestiges when the tie is fitted.

Apart from the associated cost of a complex multiple-drop hot-runner system, the practical problem with additional gates is that gate vestiges 6 are left along the working length of the strip, as shown in FIG. 6, and these can lead to damage of the thin walls 102 of the tie during fitting or tying—see FIG. 7. This occurs as the strips are pulled through one of the cells to form a loop. Any protruding gate vestiges can cut the insides of the walls, 7, and this often weakens or breaks the cell 8.

Countersinking top gates to avoid gate vestiges is only practical on sufficiently thick ties, and, since such ties have larger wall sections, they have improved flow characteristics and do not generally need so many gates anyway. They are also more rugged and less prone to damage in the first place.

It is therefore with the thinner tie strips that the problem lies; they require more gates to fill and are more susceptible to damage from the resulting vestigial protrusions.

SUMMARY OF THE INVENTION

The present invention aims to provide an improved method of producing long-chain tie strips to facilitate their manufacture by plastic forming, especially injection-moulding, without leaving damaging gate vestiges.

According to one aspect of the present invention a sheet of adjacent closely spaced integrally formed tie strips each consisting of a plurality of cells spaced along the length of the strip is injection-moulded along a runner through a series of side gates such that segments of the outermost tie strip being one or more cells in length are filled from these gates and subsequent laterally adjacent tie strips may be filled from their immediate neighbour through substantially similarly located gates. This allows reduced injection pressures. The moulded strips can be cleanly torn, stamped or cut free from each other and of any feed runner through the thin webs formed by these gates to leave minimal gate vestiges in critical areas.

It is found that using a number of very small gates is more effective at filling a long-chain tie strip cavity than a small number of larger gates as exemplified in FIG. 2. This is because the factor most responsible for reducing the injection pressure and limiting the flow length is the winding thin wall sections employed by these ties, not the gates themselves. It is therefore advantageous to fill the cells of any given strip individually or in small groups through small transverse side gates rather than to try and inject the whole cavity longitudinally (either from a central gate or gates at the end of the strip), which may result in short parts. In practice, this results in the cavity filling in a diagonal sweep radiating out from the main feed points, rather than in a linear longitudinal fashion from singular feed points. Furthermore, because the injection pressures within each cell are less diminished with this technique than would be experienced by conventional longitudinal filling, one or more additional cavities can be placed adjacent to the first, each being filled from the adjacent cavity through similar gates.

In effect, a multi-cavity tool is thus formed by connecting neighbouring cells sideways via these side gates. Accordingly, the ties are no longer moulded as individual strip units, but rather in easily separable sheets of many strips. In this way, each tie can be individualised by tearing, stamping or cutting it free from the remaining sheet through the small webs joining them together that are the moulded plastic impression of the gates. To enhance this process, the gates feeding each cell may be further sub-divided to increase the ease of separation.

A cold-runner multi-cavity tool formed by this method can therefore be as productive as a more expensive hot-runner tool equivalent where each individual tie cavity is fed from a separate nozzle. The cheaper cold-runner configuration would also be more tolerant to material contamination, which could block a hot-runner nozzle.

To solve the gate vestige problem, the gates and resulting webs are kept as small as possible, especially in land width, which will in general mean short in relation to the length and width of the strip cells and not as high as the strip thickness. There should be as little space as possible between the cavities representing adjacent strips, preferably under 1000 microns and ideally under 200 microns. This places greater demand on the mould tooling, which must be prepared with great accuracy.

After moulding, when such thin webs are broken to free the ties, the remaining vestiges are exceedingly small and are found to cause no significant damage to other cells when in use. The cell cutting issue is thus resolved. Using this method, ties of considerable length, say 30-60 cm with perhaps 50-100 cells, and moulded from suitable materials, typically below a 80D Shore hardness, have proven adequately functional in use. This is despite some small residual gate vestige remaining on both sides of every cell. In effect, these vestiges are now made part of the tie design.

BRIEF DESCRIPTION OF THE DRAWINGS

For a better understanding of the invention, embodiments of it will now be described, by way of example, with reference to the accompanying drawings, in which.

DETAILED DESCRIPTION OF THE INVENTION

Figure 8:
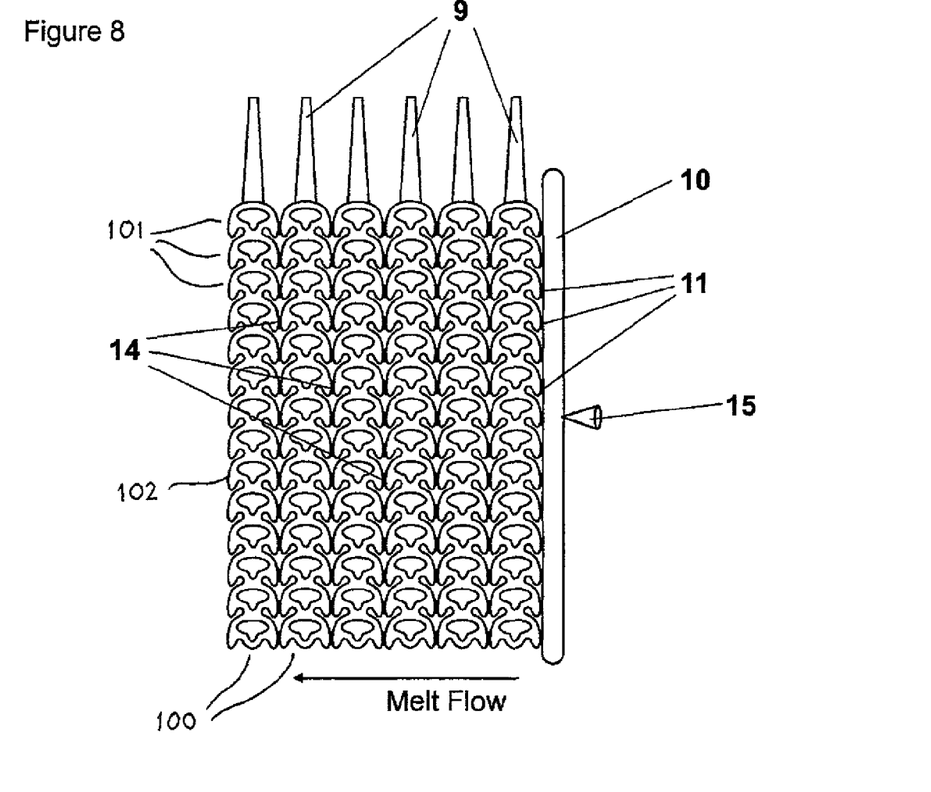
FIG. 8 shows the inventive concept of a sheet of tie strips with interconnected cells being filled through several small gates between the adjacent cavities.

FIG. 8 illustrates an embodiment of the invention in the form of a sheet of six identical tie strips as shown in FIG. 7 of WO 2004/108550, laid out side by side. Each tie strip 100 is made of a line of identical loop-shaped cells 101 through which the front end 9 of the strip can be passed, and each cell has rear-facing hooks or latching members to give a latching function. For the strip to be passed easily through a given cell, the thickness (depth) of the strip is small, and likewise the thickness of the cell walls 102 bounding the loops, which might typically be 10-20% of the width of the strip. The strips are typically made of polyurethane or physically similar material.

Figure 9:
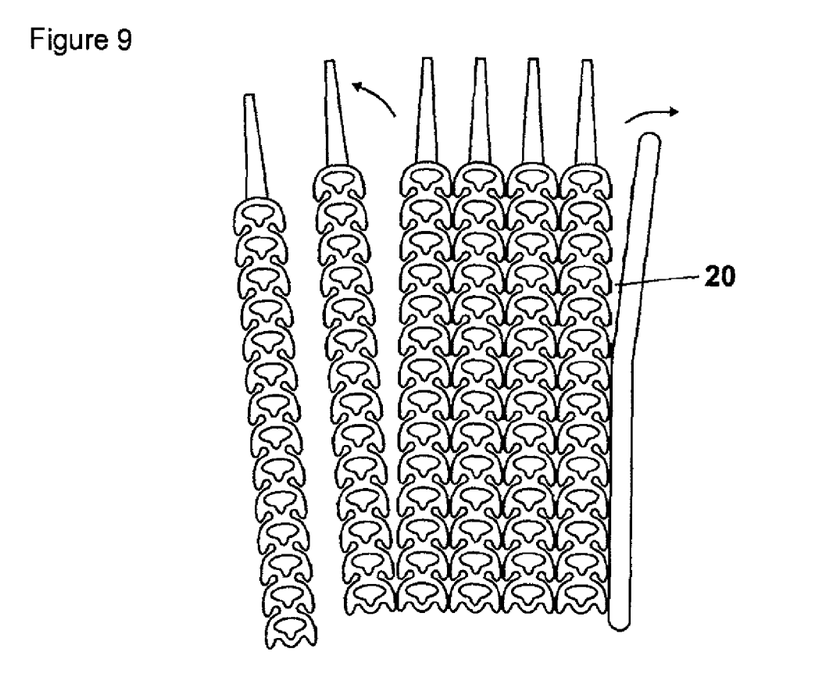
FIG. 9 shows individual ties and the runner being separated from a sheet of ties moulded by a side-gating technique.
Figure 10:
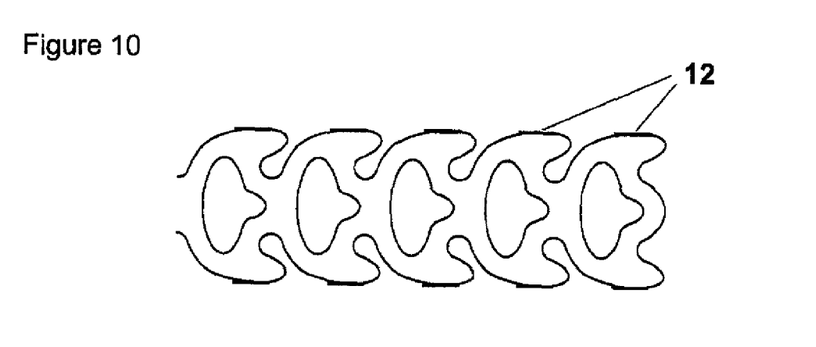
FIG. 10 shows residual gate vestiges left by this side-gating technique.
Figure 11:
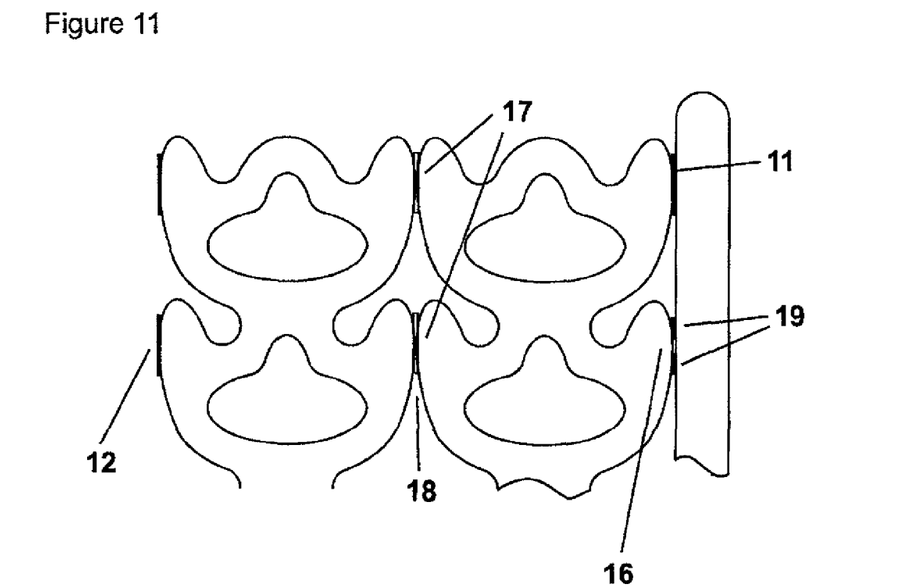
FIG. 11 shows a top view close-up of preferred gate locations and sizes in the mould and the resulting webs in the moulded article.

A sprue rod 10 at one side of the sheet illustrates the position of the runner during the moulding process, the runner typically having a main feed point 15 half-way along its length. The melt thus flows from right to left in the drawing through the sheet of strips. The mould walls between the closest parts of the adjacent strips are very thin, so that the distance between adjacent strips is small. This makes it easy to separate the strips and the sprues, as shown in FIGS. 9 and 10, e.g. by cutting, stamping or tearing, leaving only thin vestiges 12 which do not damage the cells walls during use. The mould design will now be explained. As shown in FIG. 11, small gates 11 are located along the mould cavity 9 and preferably positioned along the laterally outermost portions 16 of each cell. The gates are preferably as close to the mould runner 10 (FIG. 8) as possible, the runner being ideally of trapezoidal or circular cross-section and being fed by the main sprue 15 or by one or more hot nozzles as required for larger tools.

Figure 12:
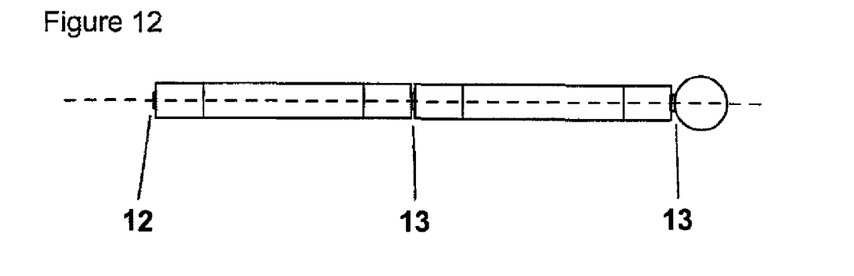
FIG. 12 shows a close-up cross-section in elevation of a preferred gate and web geometry using a two-part mould with gates along the centre of the parting line.
Figure 12A:
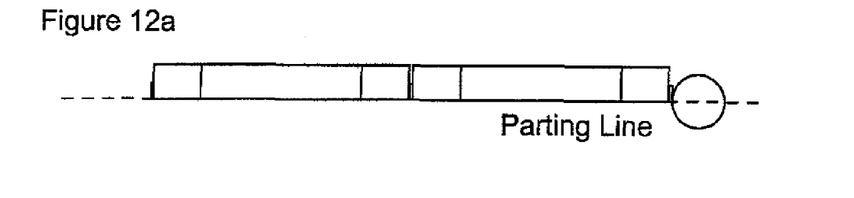
FIG. 12a shows a geometry that places the cavity into just one mould plate with the gates and webs at the surface of the cavities.

The gates are advantageously placed at regular distances along the cavity. One per cell is a typical configuration, although two or more smaller gates 19 per cell is also possible, especially on larger tie strips, as is the configuration of one gate every few cells. The latter strategy of placing fewer gates on non-consecutive cells serves to keep the edges of the mouldings cleaner (i.e., fewer gate vestiges) and also makes separation easier since fewer gates means fewer corresponding webs on the moulded part to break through. In practice, the gates are kept as narrow as possible, in the direction of the thickness of the sheet, typically under 50% of the cavity height FIG. 12. Their length (in the direction of the length of the strip) can be as long their location can accommodate 16, although shorter gates are to be preferred since shear-heating is often a necessary moulding requirement with these types of product, and smaller gates increase this effect. Small gates are also advantageous because they leave smaller webs between the ties and thereby make it easier to separate the moulding into individual ties, and also keep the edges of the finished strips cleaner. Half-round gates are preferred to the square cuts made with standard slot drills or end mills. The curved profile of these gates helps strengthen the inter-cavity walls, which need to be as thin as possible to reduce gate size and to reduce the gate vestiges 12 (FIG. 10), but also strong enough to withstand moulding pressures. Adjacent cavities are therefore preferably placed as close together as possible, as indicated at 18.

Typically this spacing is of the order of 200 microns or less, which can result in fragile thin wall sections, especially if the tie is quite deep. Such a geometry would be avoided in conventional mould design. This fragility is countered by an optimum configuration of the spacing of the cavities, the use of smaller rounded gates, and by the use of harder materials for the mould.

Advantageously, a similar plurality of gates 17 is situated on the opposite side of the first strip cavity in substantially the same location. These gates are used to fill an adjacent strip cavity without the need for additional runners.

Figure 13:
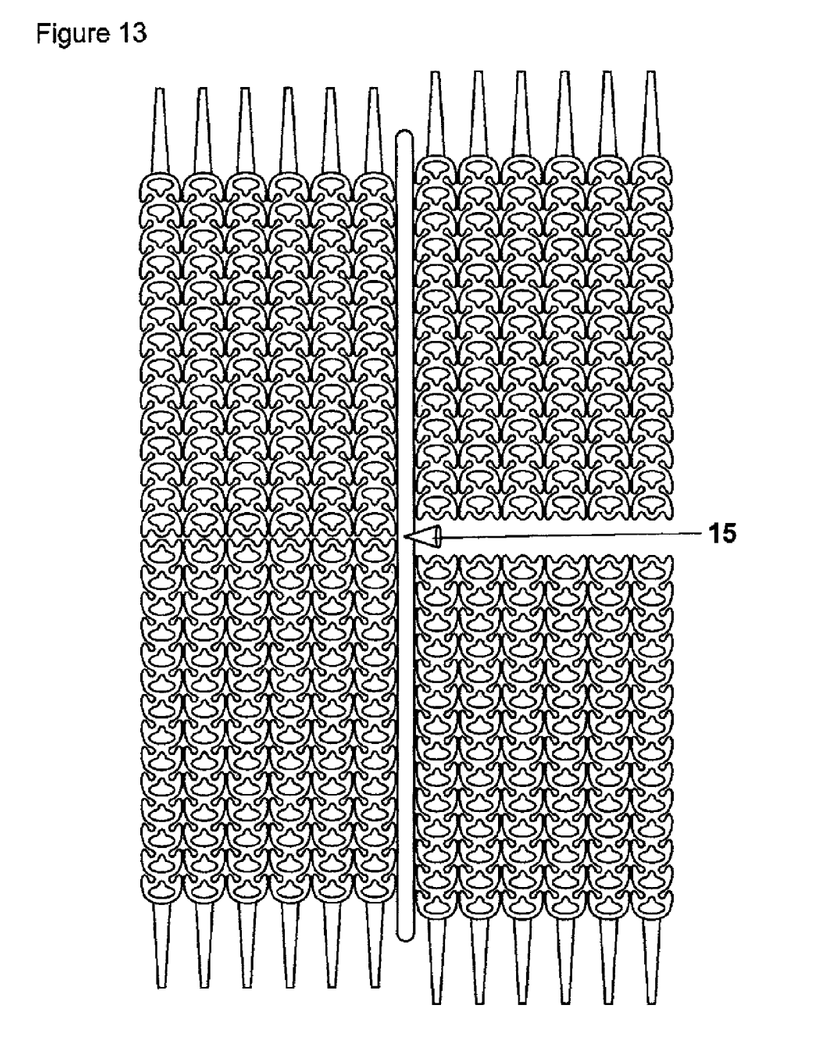
FIG. 13 shows a complete moulding of multiple sheets of tie strips moulded from the same central runner.
Figure 14:
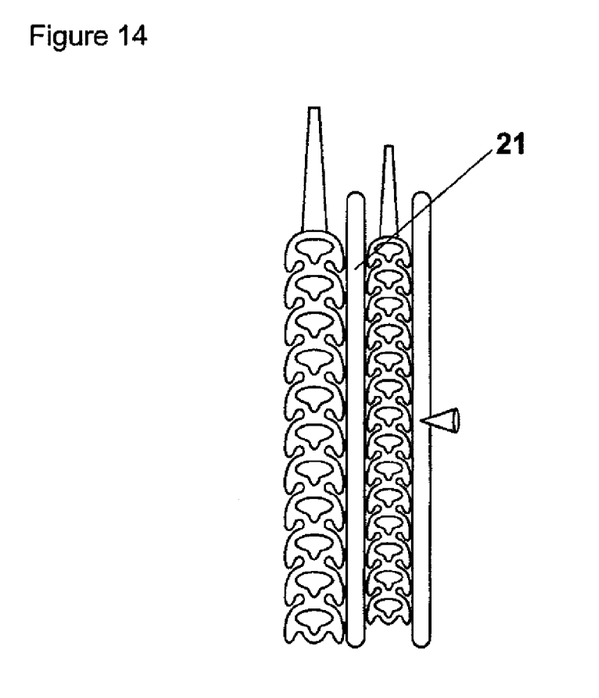
FIG. 14 shows an additional runner being used to mould tics of different cell pitches.

As shown in FIG. 14, this technique can also be used on adjacent cavities with different-sized cells, although additional runners 21 are then needed if the cells do not line up for adjacent gating, i.e. do not have integer cell spacing. In such cases these additional runners allow a switch between the two pitches, the additional runner being preferably as thin as possible, with 1 mm widths having been successfully used in practice on smaller ties. As many cavities as are practical to fill 9 may be placed side-by-side in this manner, as shown in FIG. 8, each connected to its neighbours by similar pluralities of side gates 14 and/or runners (FIG. 14). Duplicate sets of such cavity blocks may be moulded back-to-back or placed on the opposite side of the runner, as shown in FIG. 13, to increase the number of ties moulded per feed point 15.

Figure 15:
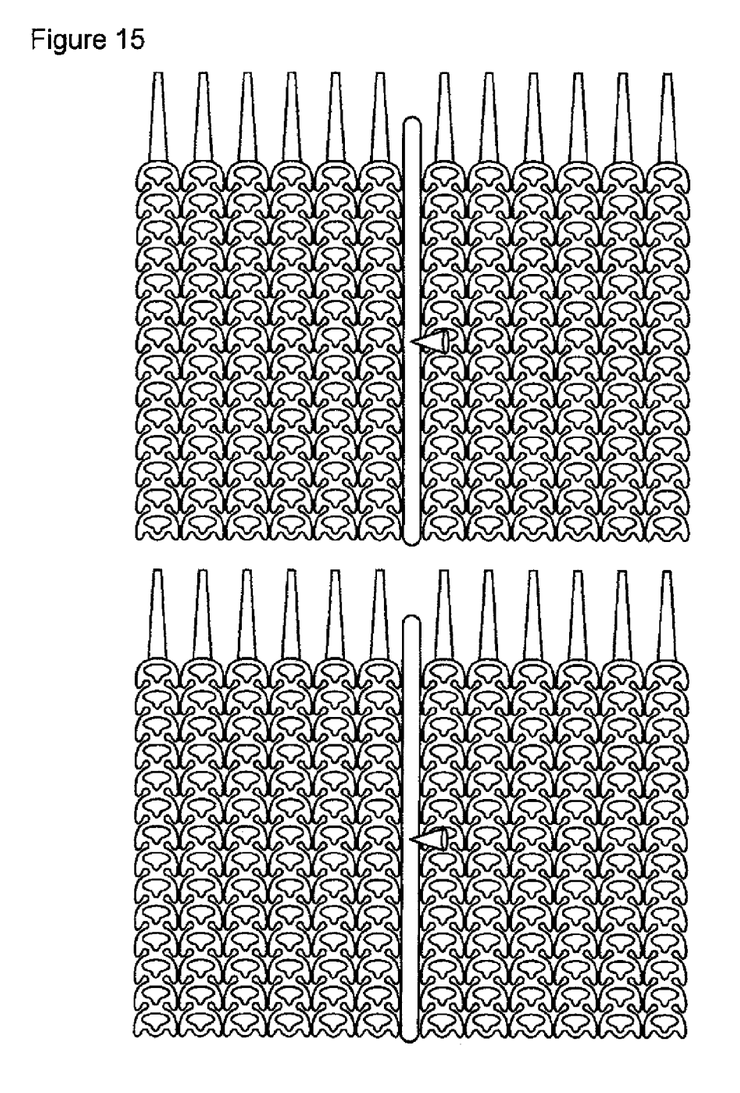
FIG. 15 shows a multi-drop system moulding into two separate cavity blocks.

As FIG. 15 shows, multi-drop hot runner moulds can be used, with separate cavities along the length. Alternatively, it can be advantageous to combine all the cavity blocks into a single super-block moulding, shown in FIG. 16, by running them into each other in the length direction, usually with small gates between the parts. This helps to even out the filling pressures and reduces flash or short-part problems which can occur if the cavities are kept separate. This technique also lends itself to moulding via small pin-gates on the top surface, obviating the need for any runners at all, and thereby allowing the production of very large contiguous sheets of ties.

After moulding, these interconnected cavities or blocks of cavities may be extracted from the mould by conventional means such as ejector pins or stripper plates. Alternatively, they can be peeled off the cavity plate, preferably using automated robotic equipment. The cavity plate (usually on the moving half) should ideally be coated with a low-friction surface, such as silicone, PTFE or chrome. The opposite mould plate (usually on the fixed half) can also be so coated, but is advantageously made using a permeable material such as porous steel to assist mould filling and venting.

A further adaptation is to index the mouldings longitudinally after each cycle, that is, to mould the end of one strip to the beginning of the next, to create continuous sheets of ties for easier handling and packaging. This same technique may also be employed to manufacture continuous lengths of tie, with each section being lifted from the mould and reinserted at the end. The next section is then over-moulded onto this free end. The strip may then be rolled up for storage.

Because the gates have been deliberately kept to a minimum size, the resulting webs between the strips are relatively easy to break, as shown at 20 in FIG. 9. The residual cold runner and the tie strips themselves are therefore readily separated from one another by breaking them along the webs. This may be done by hand or by mechanical means, noting that the individual tie strips will preferentially fold along the lines of webs. A sharp blade may be employed in this respect, although tearing is often to be preferred. Alternatively, sheets may be left intact for the end user to split as required. This makes handling and packaging the tie strips easier (especially with thinner sizes which can be too flexible to package individually), and also reduces associated costs.

Figure 16:
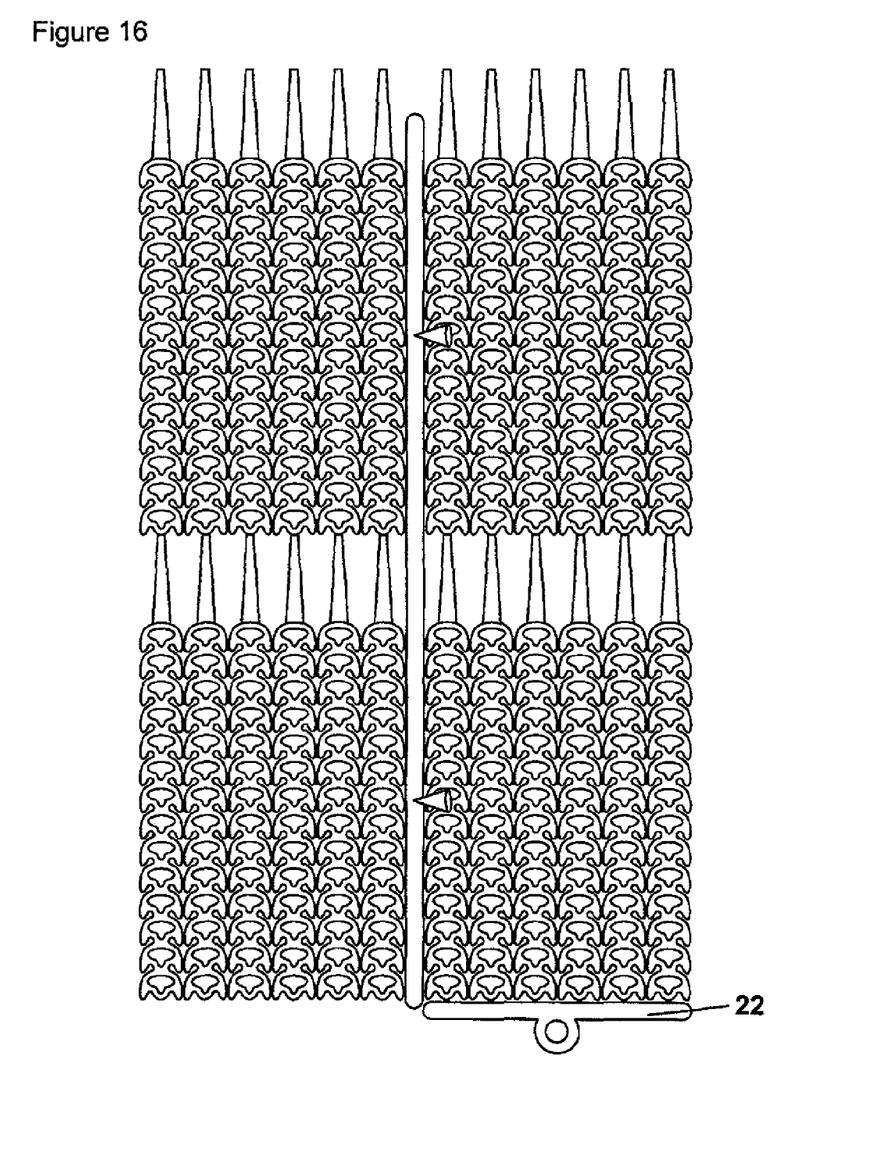
FIG. 16 shows a multi-drop system moulding into a single connected cavity block with an optional hanger tag at the end.

Sheets of ties may even be moulded with a hanger tag 22 across the rear end to assist with packaging, as shown in FIG. 16, creating a tear-off pad of ties. Multiple sheets of ties may in this way be fastened together on top of one another, for example, with a split-ring or rivet passing through a hole in the tags. This affords a convenient and attractive way of presenting the product.

This above described technique has been shown to work well with tie strips of indefinite length, up to at least 50 mm in width and up to 5 mm in thickness, made from polyurethane, polyamide, polyvinyl chloride, polylactic acid, thermoplastic elastomers or blends of these and similar materials of a typical Shore hardness in the range of 40A-80D. Similarly, ties under 6 mm wide, 1 mm thick, and over 6 tics per sheet have been shown to manufacture successfully with the above techniques, the ultimate production limits being more dependent upon the practicalities of the production process rather than the concept of the present invention. The illustrated embodiments use the inventor's current design but the invention is not restricted to this specific tie strip.

What is claimed is:

1. A sheet made of integrally formed strips each comprising:
   a series of loop-shaped unit cell portions connected end-to-end, each cell including rear-facing latching members, wherein an end of a strip in use is pulled through one of the cells to form a loop, and, wherein the strips are weakly joined side-by-side, to form a sheet having the width of two or more strips, by way of webs or lands between the latching members at their points of contact; and
   longitudinal runners where there are changes in cell spacing between adjacent strips.

2. The sheet of claim 1, where the webs or lands have a smaller or weaker cross-section that that of the strips themselves.

3. The sheet of claim 1, where the webs have a dimension between the strips of no more than 10% of the width of the strips and preferably no more than 5% of the width of the strips.

4. The sheet of claim 1, where the webs have a dimension of no more than half that of the strips in the thickness direction of the strips.

5. The sheet of claim 1, where every cell in the sheet is connected to its neighbours by one or more webs.

6. The sheet of claim 1, where every few cells in the sheet is connected to its neighbours by one or more webs.

7. The sheet of claim 1, wherein all the cells have the same spacing.

8. A moulding comprising:
   a plurality of sheets, each sheet being made of integrally formed strips each comprising a series of loop-shaped unit cell portions connected end-to-end, each cell including rear-facing latching members wherein the strips are weakly joined side-by-side, to form a sheet having the width of two or more strips, by way of webs or lands between the latching members at their points of contact, wherein each of the sheets are produced on either side along a runner.

9. The moulding of claim 8, wherein each of the sheets are joined end-to-end.

\* \* \* \* \*